Oct. 18, 1966     J. HILL     3,279,143
ARTICLE HANDLING METHOD
Filed July 22, 1963     4 Sheets-Sheet 1
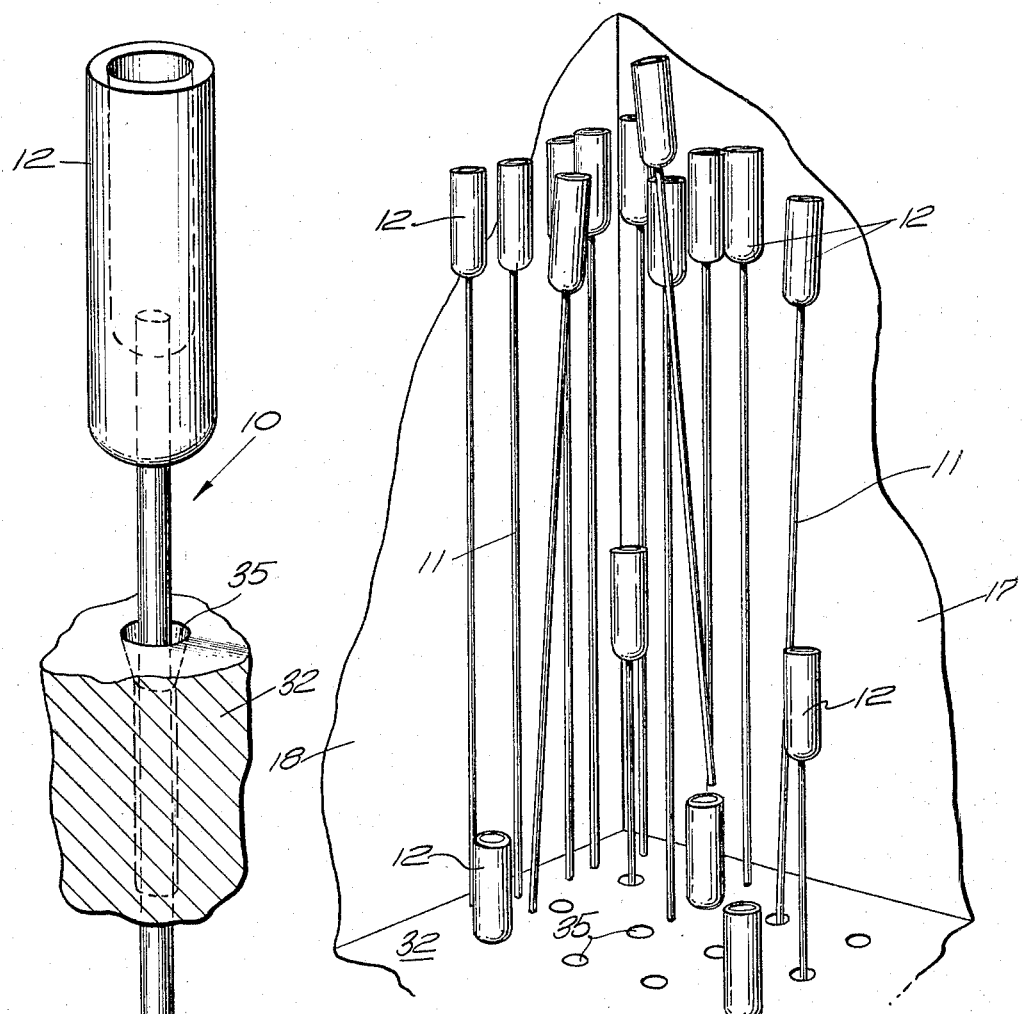
FIG. 9
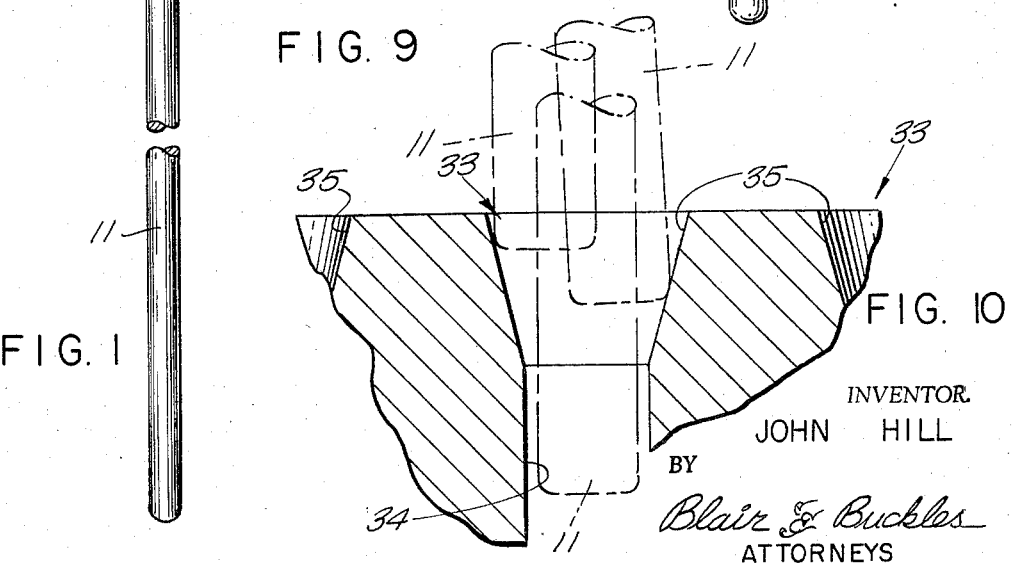
FIG. 1
FIG. 10
INVENTOR.
JOHN HILL
BY
*Blair & Buckles*
ATTORNEYS INVENTOR.
JOHN HILL
BY
*Blair & Buckles*
ATTORNEYS Oct. 18, 1966  J. HILL  3,279,143
ARTICLE HANDLING METHOD
Filed July 22, 1963  4 Sheets-Sheet 3
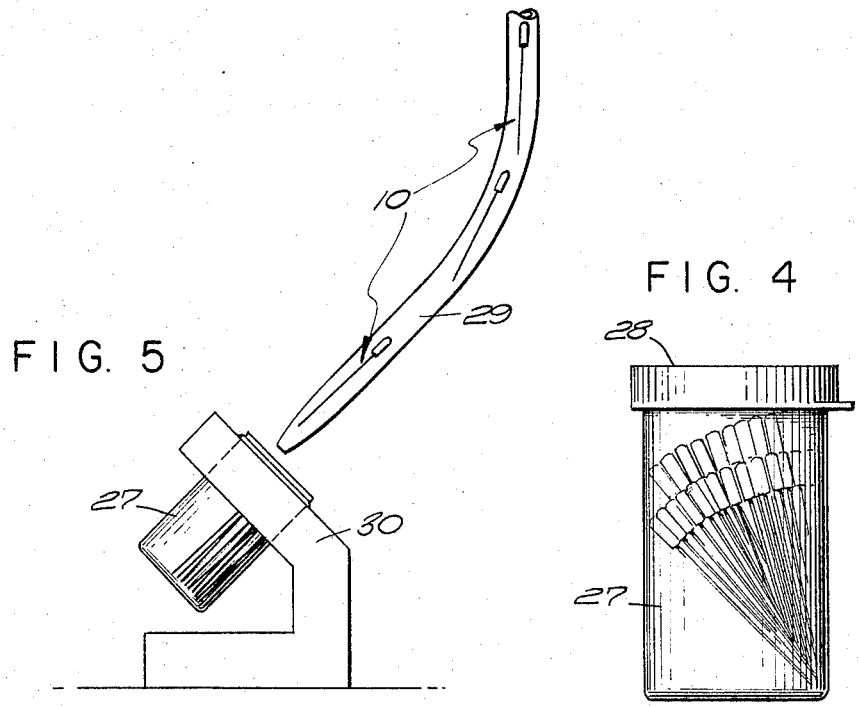
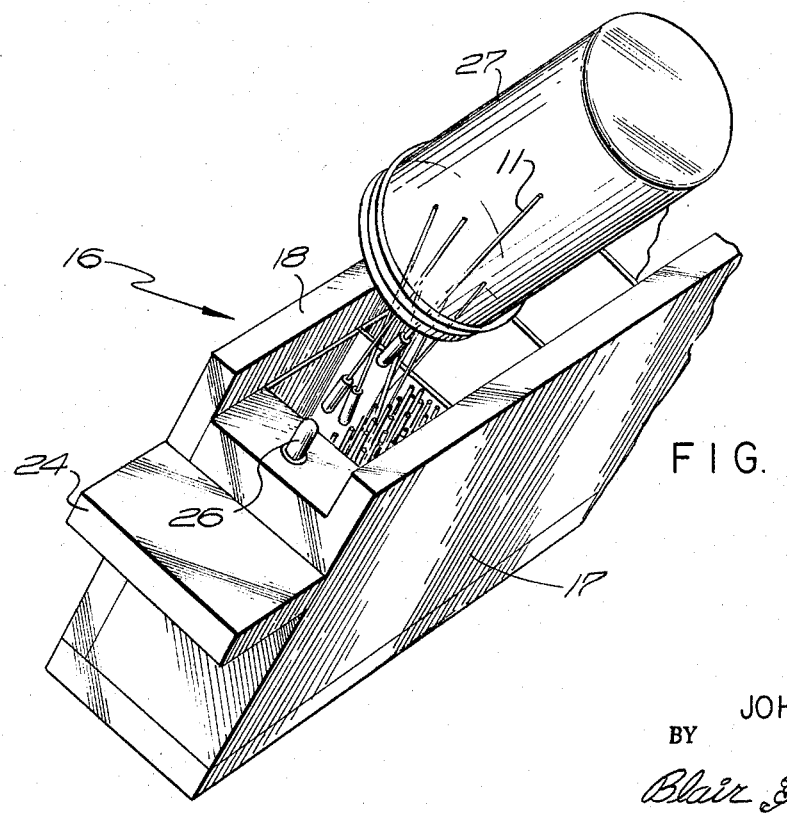
INVENTOR.
JOHN HILL
BY
Blair & Buckles
ATTORNEYS Oct. 18, 1966  J. HILL  3,279,143

ARTICLE HANDLING METHOD

Filed July 22, 1963  4 Sheets-Sheet 4

INVENTOR.
JOHN HILL
BY
Blair & Buckles
ATTORNEYS

३,२७९,१४३
ARTICLE HANDLING METHOD
John Hill, Wakefield, Mass., assignor to National Transistor Company, a subsidiary of International Telephone and Telegraph Corporation, Lawrence, Mass.
Filed July 22, 1963, Ser. No. 296,531
13 Claims. (Cl. 53—26)

This invention relates to article handling, and more particularly to a method for readying a multiplicity of like articles for further processing at their one ends.

The articles herein concerned comprise elongated members or elements in the form of wires, rods, tubes, or the like. The wire and similar members may or may not have been deformed at one or both ends, and may or may not have had a second member such as a body member, attached thereto at one end, in a manufacturing procedure preliminary or prior to that here concerned. The article ends are, however, differentiated as the "one" and the "other" ends, as hereinafter more fully appearing.

The invention method is to assemble and support or position articles of the class concerned in determined order or array for the further processing at their one ends. More particularly, a multiplicity of the articles are loaded or installed other-ends-first in a support or rack in which they are thus mounted to expose or present their one ends for the further or following processing thereat.

The invention is herein illustrated by way of example as applied to articles known as first seals, or body case assemblies, the same being indicated generally at 10, FIG. 1, and there shown to comprise a wire contact or lead 11, and a glass tube or envelope 12 joined or fused to and to extend coaxially with the wire lead 11. The glass tube or envelope 12 will be understood to define one end and the wire lead 11 to form the other end of the article, in this first seal example.

A "first seal" is a device formed in an intermediate stage of manufacture of a type or class of diodes. In one or more following diode manufacturing steps the first seals are to be processed at their one or envelope ends, as by dropping into each glass envelope successively a round solder pellet, a square germanium wafer, and a cylindrical steel weight.

In the conventional procedure which is improved upon by the invention the articles or first seals are prepared or readied for further processing at their one ends by loading or mounting a multiplicity of them in a rack or "boat," the articles being thereby supported in a manner such that the further processing may in whole or in part be done with template, jig or the like means whose use is dependent on their correlating with a predetermined or fixed array or arrangement of the articles.

Heretofore the wire and similar articles have had to be loaded into the racks one by one, and entirely by hand. Since the articles may—as in the first seal example—comprise very fine wires, and be received in very small rack passages, and since for efficient further processing the racks may be proportioned to receive a multiplicity—say several hundred—of the articles, the loading of the racks by the prior art hand method has been a painstaking, tedious, and time-consuming process.

A further prior art difficulty has been that the articles here concerned have been liable to be damaged or deformed in one or another of the various hand manipulations heretofore required en route from the taking of the articles from a supply to the loading of them into the rack. In the case of the herein illustrated first seals, for example, the lead wires tpically have a cross section of, say, 0.020 in., in which diameter the wires are highly vulnerable to bending or breaking by the manual handling, it being understood that an appreciably bent wire lead constitutes a defective first seal.

More generally, then, the rack loading operation here concerned, as carried out in the prior art, has been a costly one both in respect to the excessive time required for the hand manipulation of the articles, and in respect to the considerable degree of waste or spoilage resulting from that hand manipulation of the articles.

Under this invention a novel method is provided for automatically or mechanically loading a support with a multiplicity of wire or similar articles from a supply. As applied to the loading of the first seals into racks or boats, the invention is found to virtually eliminate the aforementioned article spoilage, and to enable the carrying out of the operation here concerned at a rate many times faster than that attained in the prior art practice. Further, the invention serves to transform the rack loading operation from a series of tedious, painstaking manipulations of the articles directly and individually to a number of easy, sure manipulations of the articles indirectly and collectively.

More particularly, my present invention provides a new and improved method for manipulating articles (of the class and for the purpose concerned) whereby they may be handled in groups, whereby they are engaged entirely by apparatus and hence without risk of damage by hand contact, and whereby a multiplicity of them are loaded simultaneously rather than individually into the support or rack for the further processing at their one ends.

The invention will be understood from the following description taken in conjunction with the accompanying drawings in which:

FIG. 1 shows on a larger scale one of the illustrative first seals as partially seated in a rack passage;

FIG. 4 shows a receptacle for articles such as here concerned;

FIG. 5 shows the collecting in the FIG. 4 receptacle of articles from a supply;

FIG. 6 shows the depositing of the articles in the FIG. 3 holder from the FIGS. 4–5 receptacle;

FIG. 9 shows on a larger scale the action of the articles in the course of the FIG. 8 manipulation;

FIG. 10 is a still larger scale detail of the engagement of the articles in the rack openings as illustrated also in FIGS. 1 and 9.

The invention method is herein shown and described with exemplary or illustrative reference to an article of the class described which is termed a first seal, and which is indicated generally at 10, FIG. 1, and there shown to comprise a Dumet wire lead 11 which may have an exposed length of 1⅝" and a diameter of 0.020", and a glass body or envelope 12 fused to and extending coaxially from one end of the wire 11, the glass body recessed as shown to receive in a following operation the solder, semi-conductor, and steel weight elements as hereinbefore pointed out.

Figure 2:
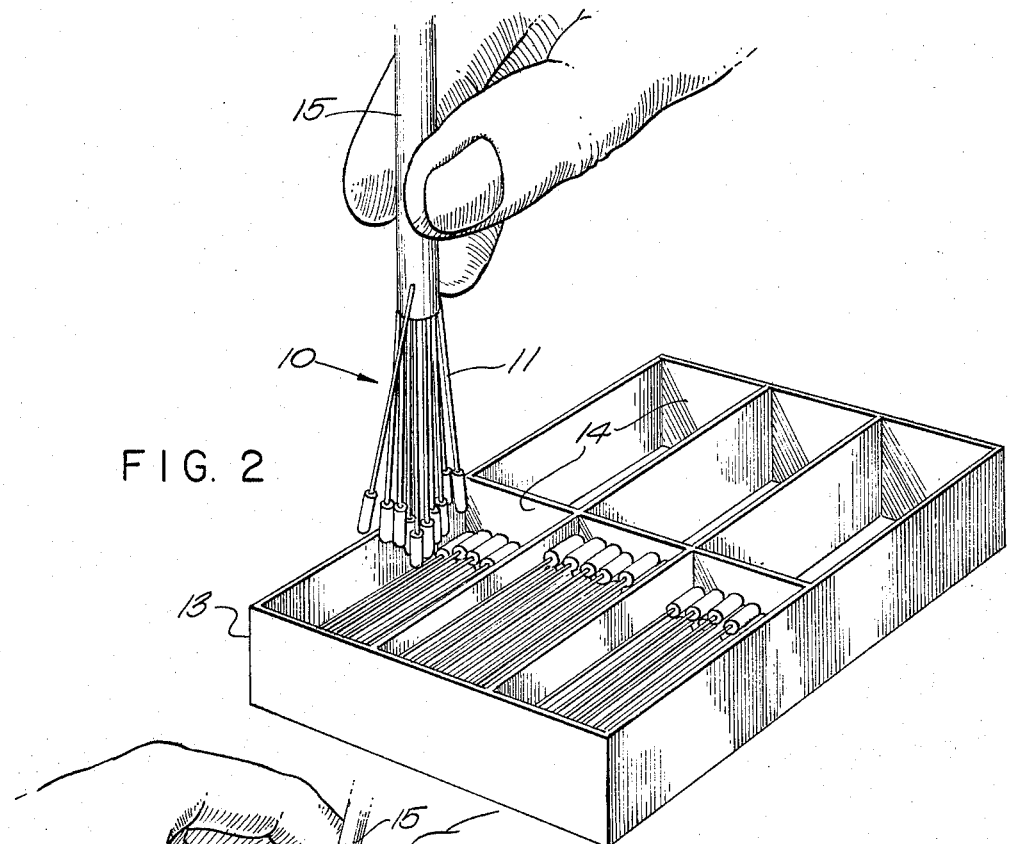
FIG. 2 shows the drawing of the articles from a supply as that may be done under the invention.

A supply of the first seals may be delivered from a prior manufacturing stage in a tray 13 having a number of compartments 14, FIG. 2, in which the seals are laid on their sides with their corresponding ends similarly oriented, or more particularly with all of the envlopes 12 defining their "one" ends pointed in the same direction.

In one mode of practising the particular step in the invention method, a manipulable group or working number of the articles drawn from the tray 13 by means of a rod or bar magnet 15 polarized to attract the first seal leads 11 to the magnet, and which is held proximate a particular tray section 14, as shown. Due to the heavier weight of their free or glass envelope ends, any of the first seals 10 which may have become disoriented in the attracting of them to the magnet 15 will then swing down into the generally vertical alignment in which the articles are shown in FIG. 2.

In accordance with the invention method the articles are then deposited in a novel holder apparatus of the invention, comprising a tray or boat loader 16, having an open top, parallel sides, 17, 18, similarly parallel but narrower ends 19, 20, and a solid bottom 21. The boat loader 16 is seen to have shown in a relatively long, narrow, rectangular construction adapting it to match or fit with the article supporting or mounting rack as hereinafter mentioned, and in that matching or fitting also to encompass the article receiving region of the rack.

The holder 16 is further shown to have one or more partitions or separators 22, in a number or at a spacing as calculated to form or divide the holder into two or more smaller holders or holder divisions proportioned to confine the articles as received endwise therein to a more or less upright position, whereby when the holder is inverted the articles will not become jammed in but rather will fall by gravity freely out of the said smaller holders or holder divisions.

The article holder or boat loader 16 is provided also with a pair of manipulating handles, 23, 24, extending outwardly from the opposite end plates 19, 20, and it is formed at its opposite ends, in the top margins of said end plates 19, 20, with a pair of projecting pins 25, 26 which are for interlocking with rack formations as hereinafter to be described.

Figure 3:
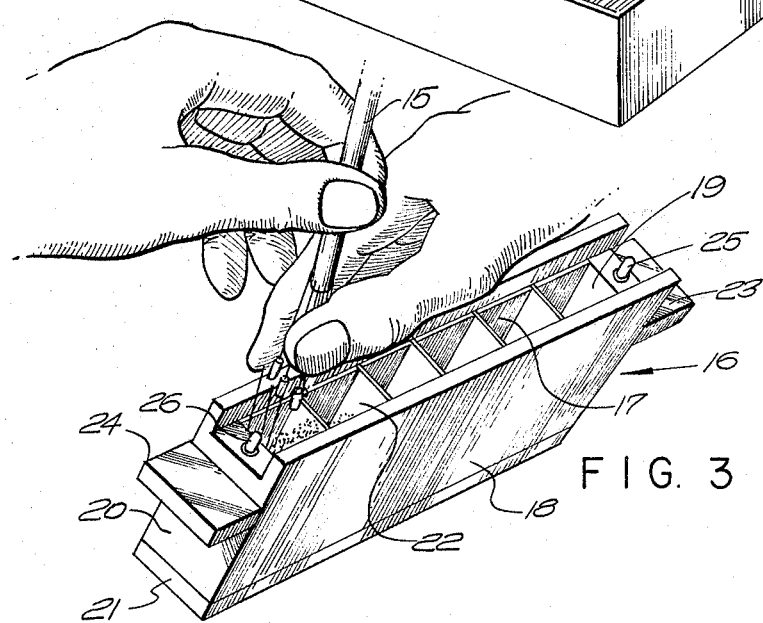
FIG. 3 shows the depositing of the articles in a holder in accordance with the invention.

Considering now what shall be called the depositing step of the method, in one mode of performing that the holder 16 is inclined or tipped towards the operator as shown, FIG. 3, the magnet 15 and its suspended first seals 10 are brought over one of the holder divisions, and the articles are then simply forced or pulled away from or free of the magnet, and so as to fall or drop into the holder division, all as illustrated in FIG. 3. The inclining of the holder 16 and the positioning of the articles thereabove is controlled in this step for accumulating the articles in the holder by stacking on their sides, and more particularly by dropping the articles lengthwise into the holder division space above and for their then falling sidewise down against the stack, in this gradually shifting the magnet 15 from the lower towards the upper side of the holder so as to keep the article drop above the stack as that gradually builds up to fill the holder division.

The described drawing and depositing steps of the invention method may be performed in various ways, in an alternative one of which, as shown in FIGS. 4 to 6, an article receptacle or plastic vial, 27, in which a manipulable group of the articles may be closed by a press fitted cap 28, may in the drawing step be automatically supplied as by a feeder terminating in an inclined discharge nozzle 29 from which the articles 10 may be dropped into the vial 27, as that may be held similarly inclined in a spring jaw or other mount 30, FIG. 5. In this the mount 30 may be moved relative to the nozzle 29 for the stacking up of the articles 10 similarly as in the drawing step mode initially described, in reference to FIG. 3.

In carrying out the depositing step with the receptacle or vial 27, that is simply inverted or inclined over the holder 16 as shown, FIG. 6, and so as to allow the articles 10 to fall or drop of their own weight into and stack up in the holder in the manner already described.

However the drawing and depositing steps may be carried out, it will be understood they may be repeated as necessary to accumulate in the holder or holder divisions as many of the working groups or manipulable numbers of the articles as are required to substantially fill the holder or its one or more divisions.

Further in accordance with the invention as herein embodied there is next inverted over the holder 16 a rack or boat indicated generally at 31 and comprising a top or loading plate 32 formed with a multiplicity of article receiving recess or passage formations 33, the recess or passage formations 33 each comprising more particularly an inner, straight sided bore portion 34 and an outer, counter sunk flared portion 35 diverging therefrom as best seen from FIG. 10. The rack loading plate 32 is seen also to have mating recess formations 36, 37 in its opposite ends for receiving the aforementioned holder guide pins 25, 26.

The article receiving rack or boat 31 further comprises a pair of similar upstanding supports or legs 38, 39 engaging loading plate 32 outwardly of its article receiving passages 33, and being of a height to elevate the plate 32 such that the depending lengths of the articles as seated therein will clear the supporting surface.

Figure 7:
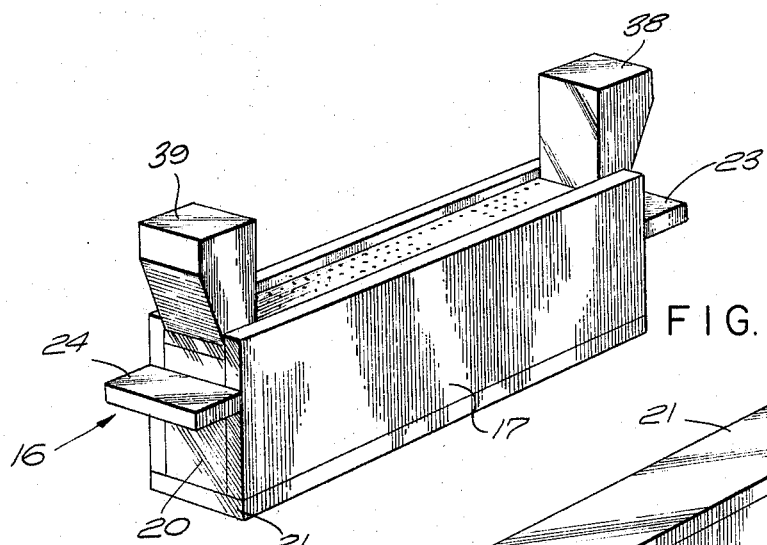
FIG. 7 shows the assembling of the FIGS. 3 and 6 holder with a rack in accordance with the invention.

In the following apparatus manipulation the holder and inverted rack are assembled or closed together as shown, FIG. 7, with the rack surface and apertures juxtaposed to the open top of the holder and thereby to the articles deposited therein, and more particularly with the loading plate 32 engaged between the upstanding portions of the holder side plates 17, 18 and with the holder pins 25, 26 engaged in the mating rack recess formations 36, 37.

Figure 8:
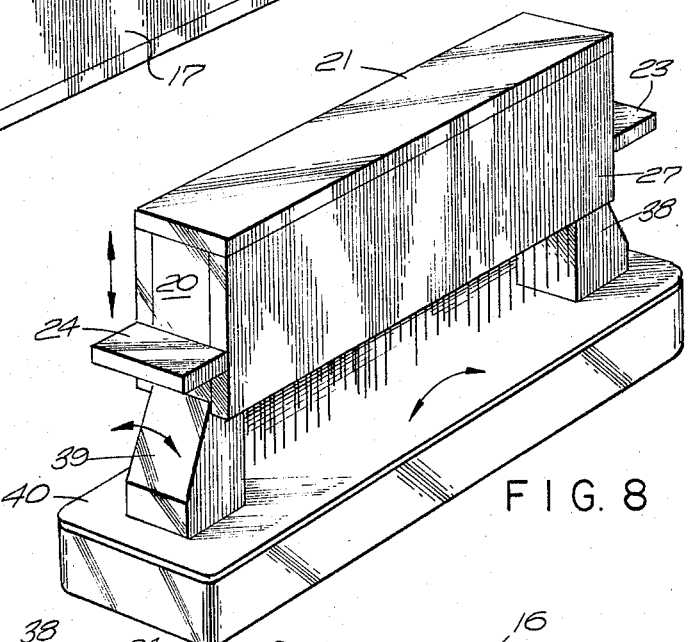
FIG. 8 shows the manipulation of the holder-rack assembly under the invention.

To further describe the invention method the holder-rack assembly is then grasped as by the handles 23, 24 and legs 38, 39 and inverted to position the holder 16 above and with its deposited articles 10 oriented or pointed with their other or wire ends first or downwards towards the now upright rack 31, whereby the articles will all of them fall down onto the loading plate 32 and will some of them drop into its passages 33, noting FIGS. 8–10. The holder-rack assembly is then agitated or manipulated to move the articles 10 about on the rack surface until they find or encounter and engage or drop into one of the recesses or passages 33, and until, more particularly, they insert their other ends or wire leads 11 in the inner bore portions 34, and seat their one ends or envelopes 12 above the flared outer portions 35 of the article receiving passages 33, FIG. 9.

It will be understood that the number of articles which may be deposited in the holder 16 will substantially exceed the number of article receiving rack passages which are juxtaposed thereto in the holder-rack assembly. The flared outer portions 35 of the article receiving passages 33 will be seen further to comprise depressions in the surface of the rack converging with the wire lead receiving bore portions 34, FIG. 10, and which aggregate a substantially larger portion or area of the rack surface than that occupied by the said bore portions 34, and thus to substantially shorten the period or interval required for the agitating of the holder-rack assembly to accomplish a substantially complete filling of the rack passages 33 with the articles 10.

In the agitating, it will be appreciated, the articles are confined by the aggregating of them as described, and as well by the holder partitions 22, to a generally upright position as indicated in FIG. 9. The flaring or angle of inclination of the rack outer passage portions 35 may thus be defined as that which provides the substantially larger open or recessed rack surface area but less than that which would cause articles of the maximum opposite angle of inclination in the holder to seat or stop against the outer portion 35 of rather than to slide down into the bore portions 34 of the rack passages 33. The general condition is clearly shown in FIG. 10, wherein the angle of incidence of articles of representative or typical attitude or orientation, as fragmentarily there shown in dashed line, is obviously such as to cause the desired downward sliding of the articles by their other ends 11 into the passages 33 and more particularly their bore portions 34.

Another limitation on the flaring of the outer passage portions 35 is of course that they must admit only one article at a time, and so not allow more than one of the articles to become jammed together therein. In the agitating it is found that the first article to gain admittance to a rack passage will deny that to the others, forcing away any that happen to seek to enter the same passage at about the same time. In a preferred mode of carrying out this agitating step there is employed a mechanical vibrator schematically shown at 40, FIG. 8, and which may be of the type known as a paper jogger such as manufactured by the Syntron Company of Homer City, Pennsylvania. The paper jogger 40 will be understood to be a device for subjecting the holder-rack assembly to vertical vibrations whose amplitude of vibration may be controlled or adjusted to effect or secure the desired manipulation of, in this case the feeding at the maximum rate of, the articles. Specifically, the articles are by the proper vibrating action made to literally hop about on the surface of the rack, and in that way to travel over as well as around the articles which have already gained seating in the rack apertures 33, FIG. 9, and so to most rapidly and freely find and engage in the rack apertures not yet occupied. In controlling the paper jogger 40 the operator will select that position within the range of amplitude adjustment at which the mass of articles is observed to move about on, but not so violently as not to feed into the openings in, the rack surface.

The desired hopping of the articles on the surface of the rack is assured by holding the holder-rack assembly as by means of the handles 23, 24 down on the surface of the vibrator 40. The moving about of the articles on the surface of the loading plate 32 may be enhanced or encouraged in this agitating step by rocking or reciprocating the holder-rack assembly about its horizontal axes as indicated by the arrows, FIG. 8.

Figure 11:
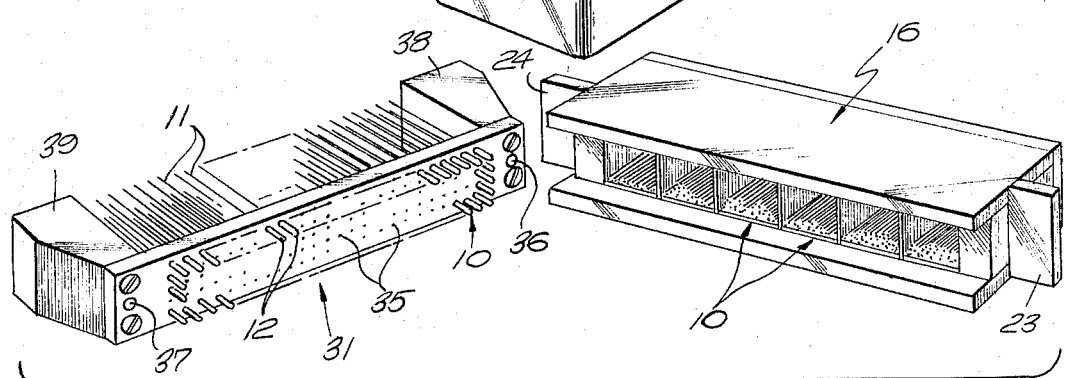
FIG. 11 shows the separation of the holder from the rack to expose the articles.

Next the holder 16 and rack 31 are removed from the vibrator 40, laid on their sides, and separated or pulled apart as shown, FIG. 11. This will be seen to open up the articles 10 in the arrangement ultimately desired; i.e., with their one ends presented or exposed. The rack 31 may then be set up on its legs to orient the articles vertically for the following processing operation as hereinbefore described.

The above described method is found to greatly improve and advance the article handling art with which the invention is concerned. Specifically, the time required for the rack loading operation herein shown and described is under the invention shortened by a factor of from twelve to eighteen to one (12–18:1) or, to strike an average, by a factor of fifteen to one (15:1). The remarkable time and labor saving here concerned represents an advance of tremendous significance for the manufacture of diodes and the like devices. This will be readily appreciated by those who are familiar with the very small cost differentials which separate profit and loss in such manufacture, with the predominance of labour over materials as increments of cost in such manufacture, and with the great numbers of the devices—on the order of several hundreds of millions of diodes of the class concerned—which are annually produced in such manufacture.

My invention is not limited to the particular embodiment thereof illustrated and described herein, and I set forth its scope in my following claims.

I claim:

1. The method of preparing a multiplicity of articles of the class described for further processing at their one ends which comprises the steps of:
   (a) drawing manipulable groups of the articles from a supply;
   (b) depositing the groups in an open top holder and with the articles standing on their one and presenting their other ends;
   (c) assembling a rack having a multiplicity of article receiving passages together with the holder and with the rack passages opposite the other article ends;
   (d) inverting the holder rack assembly to position the articles above the rack and point their other ends downwardly towards the rack passages;
   (e) agitating the holder rack assembly in a way to cause the articles to mover over the rack until they engage and then drop into the rack passages with their other ends first; and
   (f) separating the holder and rack to expose the articles now presenting their one ends.

2. The method of claim 1 wherein in the drawing step the articles are attracted to a magnetic means, and wherein in the depositing step the articles are forced off the magnetic means into the holder.

3. The method of claim 1 wherein in the drawing step the articles are stacked in a receptacle and wherein in the depositing step the receptacle is manipulated to discharge the articles into the holder.

4. The method of claim 1 wherein in the agitating step the holder-rack assembly is mechanically vibrated.

5. The method of claim 1 wherein in the agitating step the holder-rack assembly is subjected to vertical vibrations having an amplitude such as will cause the articles to hop about on the surface of the rack and collectively to rapidly engage in and fall into the rack passages.

6. The method of claim 1 wherein in the agitating step the holder-rack assembly is rocked about its horizontal axes to cause the articles to move about on the surface of the rack.

7. The method of claim 1 wherein in the depositing step the holder is inclined from the vertical and the articles are stacked on their sides.

8. The method of claim 1 wherein the drawing and depositing of the article groups is repeated so as to substantially fill the holder with the articles.

9. The method of claim 8 wherein there are deposited in the holder a multiplicity of articles whose number is substantially greater than the number of passages in the rack.

10. The method of claim 1 wherein in the depositing the articles are assembled in a tray having a number of divisions and wherein the rack passages are arranged for juxtaposition equally to said tray divisions.

11. The method of claim 10, wherein the holder divisions are arranged to orient the articles so as to drop into the rack passages upon engaging them in the agitating of the holder rack assembly.

12. The method of claim 1 wherein the articles comprise wire elements and integrally joined body elements of substantially greater cross section than the wire elements, and wherein the rack passages have inner bore portions of a cross section intermediate those of said wire and body elements whereby to receive said wire elements and seat said body elements, and wherein said rack passages have outer flared portions whereby to greatly increase the portion of the rack surface occupied by said passages.

13. The method of claim 12 wherein the outer passage portions are flared at the maximum angle of inclination from the vertical at which the engagement by articles of the maximum opposite angle of inclinatioin in said holder will cause said oppositely inclined articles to slide down said flared portions into said bore portions.

References Cited by the Examiner

UNITED STATES PATENTS

| 2,833,091 | 5/1958 | Whitney | 53—142 |
| 3,061,919 | 11/1962 | Tack | 29—428 |

FOREIGN PATENTS 61,235  9/1924  Sweden.

FRANK E. BAILEY, *Primary Examiner.*
R. L. FARRIS, *Assistant Examiner.*